(12) United States Patent
Dupuis et al.

(10) Patent No.: US 9,826,405 B2
(45) Date of Patent: *Nov. 21, 2017

(54) METHOD AND APPARATUS FOR UNLOCKING A MOBILE TELEPHONE TYPE WIRELESS COMMUNICATION TERMINAL

(71) Applicant: DRNC Holdings, Inc., Wilmington (DE)

(72) Inventors: Thierry Dupuis, Rueil (FR); Alain Guirauton, Argenteuil (FR)

(73) Assignee: DRNC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/389,064

(22) Filed: Dec. 22, 2016

(65) Prior Publication Data

US 2017/0105123 A1    Apr. 13, 2017

Related U.S. Application Data

(63) Continuation of application No. 15/141,955, filed on Apr. 29, 2016, now Pat. No. 9,572,035, which is a
(Continued)

(30) Foreign Application Priority Data

Mar. 26, 2003   (FR) ..................... 03 03690

(51) Int. Cl.
*H04W 12/08* (2009.01)
*H04W 8/20* (2009.01)
(Continued)

(52) U.S. Cl.
CPC ....... *H04W 12/08* (2013.01); *H04M 1/72577* (2013.01); *H04W 8/205* (2013.01); *H04W 12/12* (2013.01)

(58) Field of Classification Search
CPC ..... H04W 12/08; H04W 88/02; H04W 12/04; H04W 12/10; H04W 8/183; H04W 8/265; G06F 21/12; H04L 63/12; H04M 1/673
See application file for complete search history.

(56) References Cited

U.S. PATENT DOCUMENTS 6,052,581 A    4/2000  O'Connell et al.
6,124,799 A    9/2000  Parker
(Continued)

FOREIGN PATENT DOCUMENTS

EP    1061755       12/2000
EP    1263248       12/2002
WO    WO-1998/057511 12/1998

OTHER PUBLICATIONS

"European Search Report", EP Application No. 04290731.1-2412-, dated Jul. 16, 2004, 2 pages.
(Continued)

*Primary Examiner* — Nam Huynh
(74) *Attorney, Agent, or Firm* — Eric Berkowitz

(57) ABSTRACT

A method of unlocking a mobile terminal and a mobile terminal is disclosed. The mobile terminal is initially locked to the services of a mobile services provider. The mobile services provider transmits to a predefined telephone number associated with a service provider other than the mobile services provider, via the mobile services provider, a request for unlocking information. The request is transparent to the mobile services provider. If the request is approved, the mobile terminal receives the unlocking information. Using the received unlocking information, the mobile terminal unlocks itself so that it is no longer locked to the services of the mobile services provider. If the request is not approved, the mobile terminal receives and displays a message indicating that the request is not approved.

13 Claims, 1 Drawing Sheet

Related U.S. Application Data continuation of application No. 14/064,594, filed on Oct. 28, 2013, now Pat. No. 9,357,392, which is a continuation of application No. 12/730,385, filed on Mar. 24, 2010, now Pat. No. 8,600,351, which is a continuation of application No. 10/808,465, filed on Mar. 25, 2004, now Pat. No. 7,689,204.

(51) Int. Cl.
  *H04W 12/12* (2009.01)
  *H04M 1/725* (2006.01)

(56) References Cited

U.S. PATENT DOCUMENTS

| | | | |
|---|---|---|---|
| 6,314,283 B1 * | 11/2001 | Fielden | H04M 1/673 455/410 |
| 6,550,010 B1 | 4/2003 | Link, II et al. | |
| 6,577,857 B1 | 6/2003 | Rodriguez | |
| 6,611,913 B1 | 8/2003 | Carroll et al. | |
| 6,829,492 B2 | 12/2004 | Aerrabotu | |
| 7,502,367 B2 * | 3/2009 | Becher | G06F 21/12 370/389 |
| 2004/0092248 A1 | 5/2004 | Kelkar et al. | |

OTHER PUBLICATIONS

"United States Office Action", U.S. Appl. No. 14/064,594, dated Apr. 21, 2015, 11 pages.
"United States Office Action", U.S. Appl. No. 12/730,385, dated Jan. 17, 2013, 7 pages.
U.S. Pat. No. 7,689,204, granted on Mar. 30, 2010.
U.S. Pat. No. 8,600,351, granted on Dec. 3, 2013.
U.S. Pat. No. 9,357,392, granted on May 31, 2016.
U.S. Pat. No. 9,572,035, granted on Feb. 14, 2017.

* cited by examiner

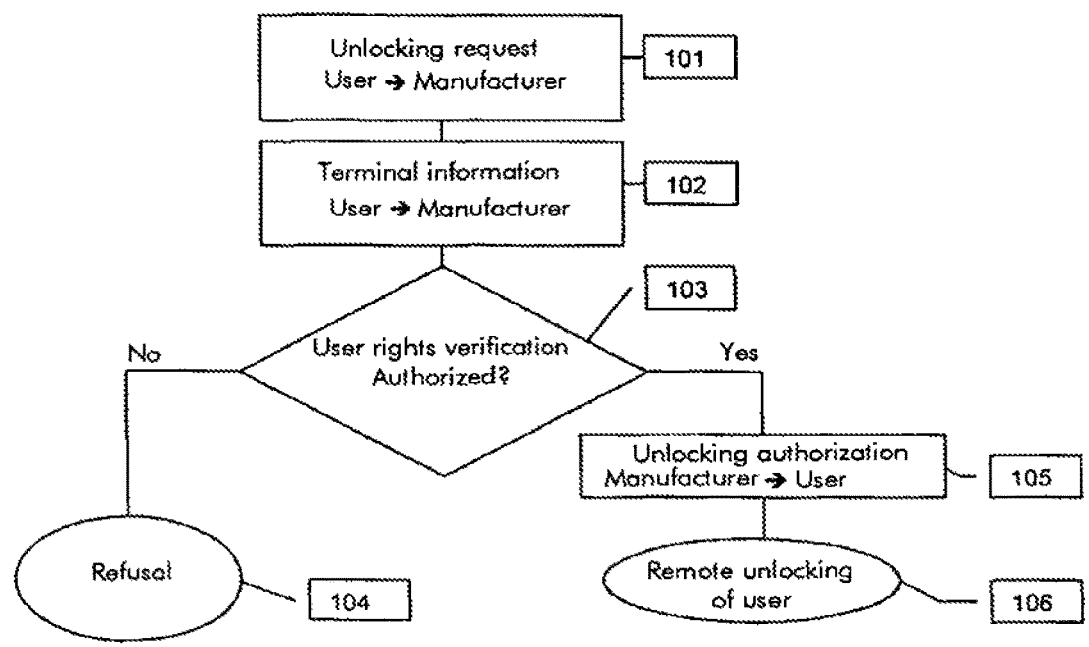

METHOD AND APPARATUS FOR UNLOCKING A MOBILE TELEPHONE TYPE WIRELESS COMMUNICATION TERMINAL

CROSS REFERENCE TO RELATED APPLICATIONS

This application is a continuation of U.S. patent application Ser. No. 15/141,955 filed Apr. 29, 2016, which is a continuation of U.S. patent application Ser. No. 14/064,594 filed Oct. 28, 2013, now U.S. Pat. No. 9,357,392, which is a continuation of U.S. patent application Ser. No. 12/730,385 filed Mar. 24, 2010, now U.S. Pat. No. 8,600,351, which is a continuation of U.S. patent application Ser. No. 10/808,465, filed Mar. 25, 2004, now U.S. Pat. No. 7,689,204, which claims priority from French Patent Application No. 03 03 690, filed Mar. 26, 2003, the contents of each being incorporated by reference as if fully set forth herein.

FIELD OF INVENTION

The embodiments of the present invention described herein relate to methods of unlocking mobile telephone type wireless communication terminals and, more particularly, to SIM-LOCK type systems.

BACKGROUND

A locking system provides the following actions: locking a mobile telephone to the services of a particular operator; locking a mobile telephone to particular services of a given operator; and locking a mobile telephone to a given SIM card microchip to prevent the use of the mobile telephone with a microchip card other than that with which the telephone was sold.

The locking system generally allows an operator to ensure that a customer who has purchased a telephone in the context of a promotion, whereby the telephone is sold at a very much reduced price on condition that the customer uses a particular subscription for a relatively long period, will comply with the terms of his agreement. This also solves other problems, for example the use of a stolen telephone with another microchip card.

It is nevertheless necessary to provide means for canceling such locking, for example at the end of an agreement. A specific piece of information referred to hereinafter as the locking key is introduced into the telephone by the manufacturer during its manufacture, and problems with unlocking relate essentially to relations between the user of the telephone and the telephone operator, the standard practice being for a manufacturer to communicate a list of keys to an operator. The latter then carries out the unlocking at the request of the user, after verifying the latter's rights.

Transferring unlocking keys necessitates secure communication between manufacturers and operators.

As there is generally no exclusive agreement between them, each manufacturer supplies all operators, and vice-versa. Communication is not secure.

Furthermore, the number of telephone designs increases daily. There are therefore serious communication problems that lead to serious malfunctions and a very large number of complaints from users.

SUMMARY

An embodiment of the present invention is directed to a method of unlocking a mobile terminal, which is initially locked to the services of a mobile services provider. The mobile services provider transmits to a predefined telephone number associated with a service provider other than the mobile services provider a request for unlocking information. The request is transmitted via the services of the mobile services provider and is transparent to the mobile services provider. If the request is approved, the mobile terminal receives the unlocking information. Using the received unlocking information, the mobile terminal unlocks itself so that it is no longer locked to the services of the mobile services provider. If the request is not approved, the mobile terminal receives and displays a message indicating that the request is not approved.

An embodiment of the present invention is directed to a mobile terminal, which is initially locked to the services of a mobile services provider. The mobile terminal includes a transmitter that is configured to transmit to a predefined telephone number associated with a service provider other than the mobile services provider a request for unlocking information. The request is transmitted via the services of the mobile services provider and is transparent to the mobile services provider. The mobile terminal also includes a receiver that is configured to receive the unlocking information if the request is approved. Further, the mobile terminal includes a control unit that is configured to control the mobile terminal to unlock itself so that it is no longer locked to the services of the mobile services provider if the request is approved. The receiver may be further configured to receive a message indicating that request is not approved if the request is not approved. The mobile terminal may also include a display that is configured to display the message indicating that the request is not approved responsive to the receiver receiving the message indicating that the request is not approved.

BREIF DESCRIPTION OF THE DRAWING

Other features and advantages of the invention will become clearly apparent in the course of the following description, which is given with reference to the appended drawing, which is a flowchart of the method of the invention.

DETAILED DESCRIPTION

The embodiments of the present invention described herein apply to any telecommunications or terminal compatible with network technologies such as DECT, CDMA, WCDMA, GSM, UMTS, etc.

As used herein, the term mobile communication terminal means any device associated with an integrated circuit card, also known as a microchip card, and conventionally referred to as a subscriber identity module ((SIM) or (USIM)) card.

In accordance with the invention, unlocking is performed by the telephone itself at the request of the user. To this end, the manufacturer sends specific information constituting an unlocking key to the telephone concerned.

Thus, according to the invention, a telephone manufacturer holds in a database the unlocking keys of all the telephones that it has manufactured, without communicating them to operators to whom it has shipped telephones.

However, the keys are associated in the database with means for identifying the corresponding telephones. For example, the serial number of the telephone may be used as unique characterizing information (International Mobile Equipment Identity—IMEI).

An operator may store in its own database the identification of a telephone supplied to a particular user, again with reference to its serial number, for example.

In a symmetrical manner, a user may easily identify his telephone, for example simply by reading the serial number indicated on the telephone. According to the invention, a user who requires unlocking of his telephone communicates an unlocking request directly to the manufacturer of the telephone (step 101) together with the identification of the telephone concerned, for example its serial number (step 102).

This communication is transparent for the user's operator. The communication is affected by a telephone call using the telephone itself, for example by the user calling a telephone number indicated alongside the serial number or supplied by the operator at the time of submitting the request.

The manufacturer and the operator verify that the user is entitled to request unlocking (step 103), either manually by means of a telephone call or automatically by automated database look-up means. In this step, the operator does not have to consult lists of keys from various sources, but merely verifies its contractual relationship with a user in regard to a listed telephone. Verification is therefore much simpler and leads to a "yes" or a "no" response.

If the response is "no," unlocking is refused and the action terminates in a refusal (step 104).

If the response is "yes," the manufacturer communicates the unlocking instruction directly to the user (step 105).

This communication is also affected by any suitable means, i.e. usually by sending via the telephone network an unlocking code received by the telephone itself, which then proceeds to unlock itself.

Clearly this code is transmitted via the network managed by the operator, but once again the latter merely serves as a passive transmitter, for whom the operation is transparent.

In a variant of the invention, the manufacturer sends the code using a secure system provided in advance for preventing fraudulent unlocking by an unauthorized third party.

The telephone is then unlocked (step 106).

To minimize errors and complaints, the invention also proposes to send the user, and possibly the operator, a confirmation message containing a summary of the operations effected.

The message includes at least an indication of unlocking of the telephone, or, where applicable, of refusal to unlock. It may also contain complementary information such as references, for example time references, of the unlocking request and the outcome thereof, and, where applicable, the reasons for refusal. Where appropriate, in order to preserve the confidentiality of some of the information transmitted, the message sent to the operator is different from that sent to the user.

The message may be sent by any means.

The data may advantageously be transmitted digitally on the speech channel using a data modulation device. The bit rate of the data and the carrier frequency of the modulation may be chosen so that the shape of the main lobe of the data modulation spectrum at the input of the speech coder is preserved on the output side of the speech coder and decoder.

Thus, the bit rate is relatively low, and there is no additional cost for data transmission as no specific subscription is required to transmit the data. Another advantage of this solution is that it enables a manufacturer to obtain access to all its terminals, even if the user has not subscribed to data transmission services ("service data") or if the user's terminal is not compatible. This solution does not rule out other solutions. A transmission medium such as the GPRS, for example, may be used.

What is claimed is:

1. A method implemented by a mobile terminal that is manufactured by a manufacturer and locked to services of a first mobile services provider, the method comprising:
   on condition that the mobile terminal is entitled to be unlocked based on an approval received by the manufacturer of the mobile terminal from the first mobile services provider, receiving, by the mobile terminal via a system of the manufacturer of the mobile terminal from the manufacturer of the mobile terminal, unlocking information generated by the manufacturer of the mobile terminal; and
   unlocking, by the mobile terminal using the received unlocking information, a Subscriber Identity Module (SIM) card or a microchip associated with the mobile terminal such that the mobile terminal is not locked to the services of the first mobile services provider and can operate with a second mobile services provider.

2. The method of claim 1, further comprising sending, by the mobile terminal, a unique identifier associated with the mobile terminal.

3. The method of claim 2, wherein the sending of the unique identifier includes sending any of: (1) a telephone number; (2) a serial number; or (3) an International Mobile Equipment Identifier (IMEI), as at least a portion of the unique identifier.

4. The method of claim 1, further comprising initially locking the SIM card or the microchip to the mobile terminal such that the mobile terminal is locked to the services of the first mobile services provider, wherein the unlocking of the SIM card or the microchip associated with the mobile terminal includes unlocking the SIM card from the mobile terminal such that another SIM card can operate with the mobile terminal.

5. The method of claim 1, wherein the receiving of the unlocking information is only from the manufacturer of the mobile terminal via the system of the manufacturer such that the first mobile services provider does not have access to the unlocking information.

6. A method implemented by a database operated by a manufacturer of a plurality of mobile terminals, the database storing information associated with the plurality of mobile terminals for unlocking services associated with one or more mobile services providers, the method comprising:
   receiving, from a first mobile services provider of the one or more mobile services providers, unlocking verification information for a respective mobile terminal of the plurality of mobile terminals having information stored in the database;
   storing in the database the unlocking verification information in association with a stored unique identifier of the respective mobile terminal;
   receiving from the mobile terminal via a system of the manufacturer, the unique identifier of the respective mobile terminal;
   obtaining, by the database using the received unique identifier in accordance with the unlocking verification information associated with the unique identifier of the mobile terminal, unlocking information for unlocking the respective mobile terminal from services of the first mobile services provider; and
   sending the obtained unlocking information.

7. The method of claim 6, wherein the obtaining of the unlocking information includes:

looking up, in the database using the received unique identifier, the information stored in the database that is associated with the respective mobile terminal; and generating the unlocking information including an unlock code.

8. A mobile terminal that is manufactured by a manufacturer and locked to services of a first mobile services provider, comprising:
- a receiver configured to receive via a system of the manufacturer of the mobile terminal from the manufacturer of the mobile terminal, unlocking information generated by the manufacturer of the mobile terminal, the reception of the unlocking information conditioned on the mobile terminal being entitled to be unlocked based on an approval received by the manufacturer of the mobile terminal from the first mobile services provider; and
- a processor configured to unlock, using the received unlocking information, a SIM card or a microchip associated with the mobile terminal such that the mobile terminal is not locked to the services of the first mobile services provider and can operate with a second mobile services provider.

9. The mobile terminal of claim 8, further comprising a transmitter configured to send a unique identifier associated with the mobile terminal.

10. The mobile terminal of claim 9, wherein the transmitter is configured to send any of: (1) a telephone number; (2) a serial number; or (3) an International Mobile Equipment Identifier (IMEI), as at least a portion of the unique identifier.

11. The mobile terminal of claim 9, wherein the transmitter is configured to send the unique identifier via a network of the first mobile services provider.

12. The mobile terminal of claim 8, wherein the SIM card is configured to be selectively locked to, or unlocked from, the mobile terminal causing the mobile terminal to be locked to, or unlocked from, the services of the first mobile services provider.

13. The mobile terminal method of claim 8, wherein the receiver receives the unlocking information only from the manufacturer of the mobile terminal via the system of the manufacturer such that the first mobile services provider does not have access to the unlocking information.

* * * * *

UNITED STATES PATENT AND TRADEMARK OFFICE
CERTIFICATE OF CORRECTION

PATENT NO. : 9,826,405 B2
APPLICATION NO. : 15/389064
DATED : November 21, 2017
INVENTOR(S) : Thierry Dupuis et al.

Page 1 of 1

It is certified that error appears in the above-identified patent and that said Letters Patent is hereby corrected as shown below:

In the Specification

Column 2, Line 37, "BREIF" should read --BRIEF--.

In the Claims

Claim 13, Column 6, Line 18, "mobile terminal method" should read --mobile terminal--.

Signed and Sealed this
Fifteenth Day of May, 2018

Andrei Iancu
*Director of the United States Patent and Trademark Office*